Figure 1:
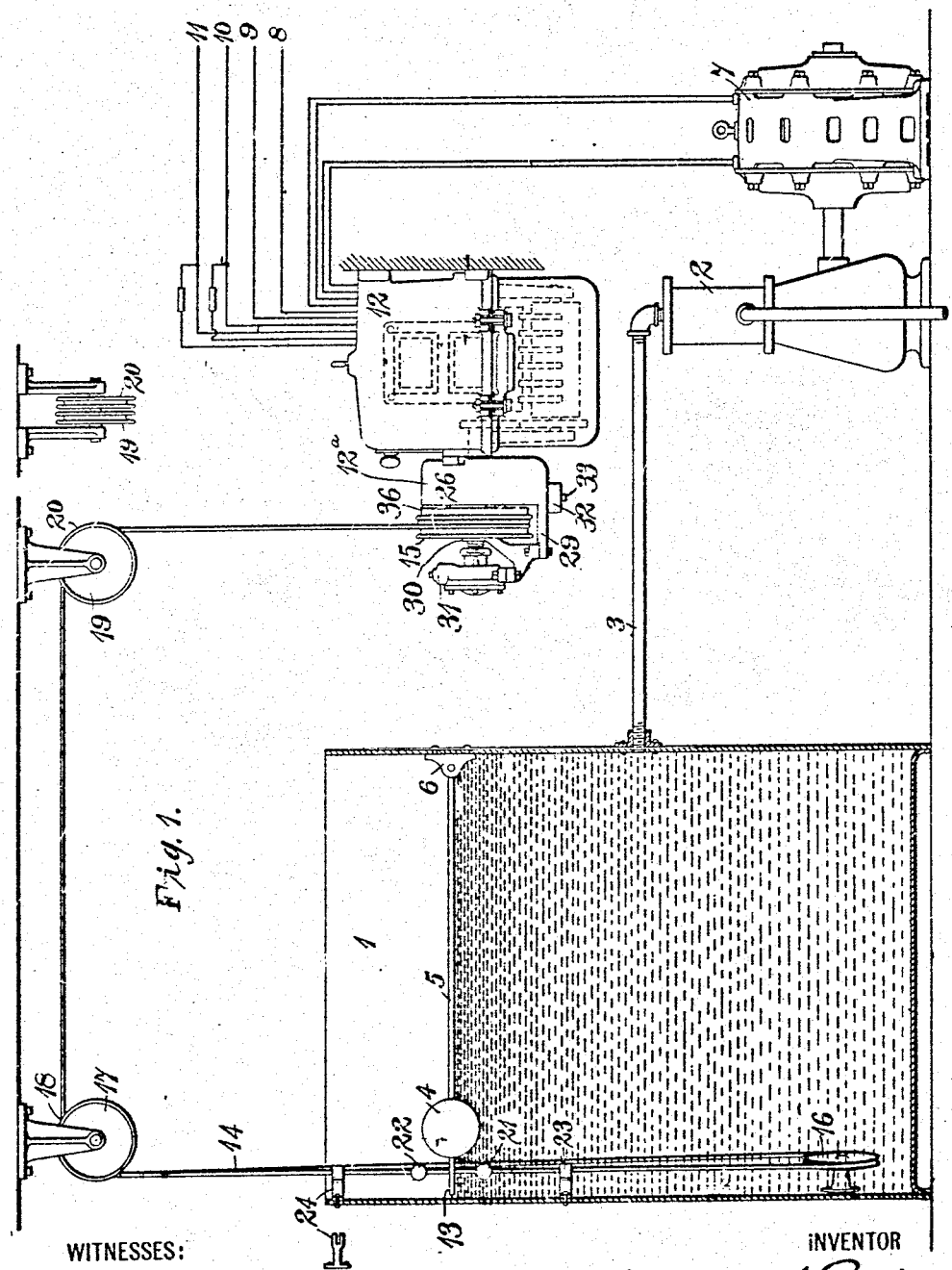

W. A. PARIS.
CONTROLLER FOR ELECTRIC MOTORS.
APPLICATION FILED DEC. 28, 1905.

989,401.

Patented Apr. 11, 1911.
3 SHEETS—SHEET 1.

WITNESSES:
Fred. H. Miller
R. J. Dearborn.

INVENTOR
William A. Paris
BY
Wesley G. Carr
ATTORNEY

W. A. PARIS.
CONTROLLER FOR ELECTRIC MOTORS.
APPLICATION FILED DEC. 28, 1905.

989,401.

Patented Apr. 11, 1911.
3 SHEETS—SHEET 2.

WITNESSES:
Fred. H. Miller
R. J. Dearborn

INVENTOR
William A. Paris
BY
Wesley G. Carr
ATTORNEY

W. A. PARIS.
CONTROLLER FOR ELECTRIC MOTORS.
APPLICATION FILED DEC. 28, 1905.

989,401.

Patented Apr. 11, 1911.

3 SHEETS—SHEET 3.

WITNESSES:
Fred. H. Miller
R. J. Dearborn

INVENTOR
William A. Paris
BY
Chesley J. Cain
ATTORNEY

UNITED STATES PATENT OFFICE.

WILLIAM A. PARIS, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CONTROLLER FOR ELECTRIC MOTORS.

989,401.    Specification of Letters Patent.    Patented Apr. 11, 1911.

Application filed December 28, 1905. Serial No. 293,631.

*To all whom it may concern:*

Be it known that I, WILLIAM A. PARIS, a citizen of the United States, and a resident of Edgewood Park, in the county of Allegheny and State of Pennsylvania, have invented a new and useful Improvement in Controllers for Electric Motors, of which the following is a specification.

My invention relates to controlling means for electric motors and has special reference to means for effecting the automatic control of such motors as are adapted to operate fluid-pumping devices.

The object of my invention is to provide suitable means for automatically starting and stopping electric motors that shall be simple and durable in construction and effective in operation and that shall be dependent upon predetermined fluid head limits in a tank or reservoir which is supplied by a motor-driven fluid-pump.

When an electric motor is employed for driving a fluid-pumping device to supply a storage tank or reservoir, it is usually desirable to start or stop the motor automatically as the fluid head falls below or rises above predetermined limits. In order to effect this result without injuring the motor or taking excessive current from its supply circuit, a starting controller may preferably be employed which is adapted for use with the motor in question. Time should also be allowed for the motor to reach substantially a constant speed on each starting notch and a positive movement of the controller from one notch to the next should be insured in order to protect the controller contact parts from deterioration by reason of electric arcs. For effecting these objective results, I provide an automatic governing device which may readily be adapted for use with various types of electric motors and controlling devices and which comprises, in general, a sheave that is rotatably mounted upon a shaft which may be integral with or geared to the shaft of a control drum, means for rotating the sheave through predetermined arcs in either direction according to the fluid head in the tank or reservoir which is supplied by the motor driven pump, and means for suitably operating the control drum through a series of starting positions.

My invention is illustrated in the accompanying drawings, in which—

Figure 2:
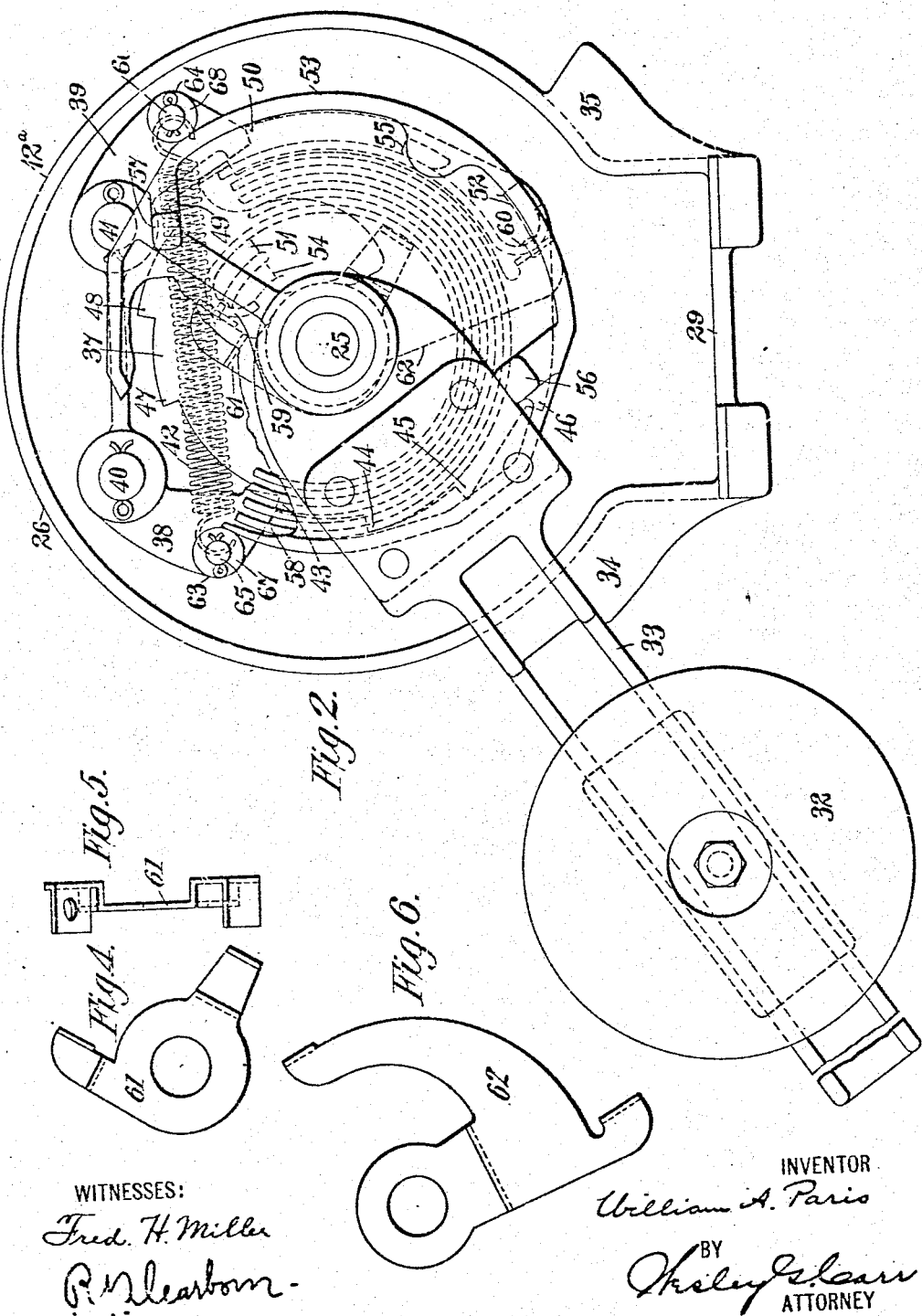
Figure 3:
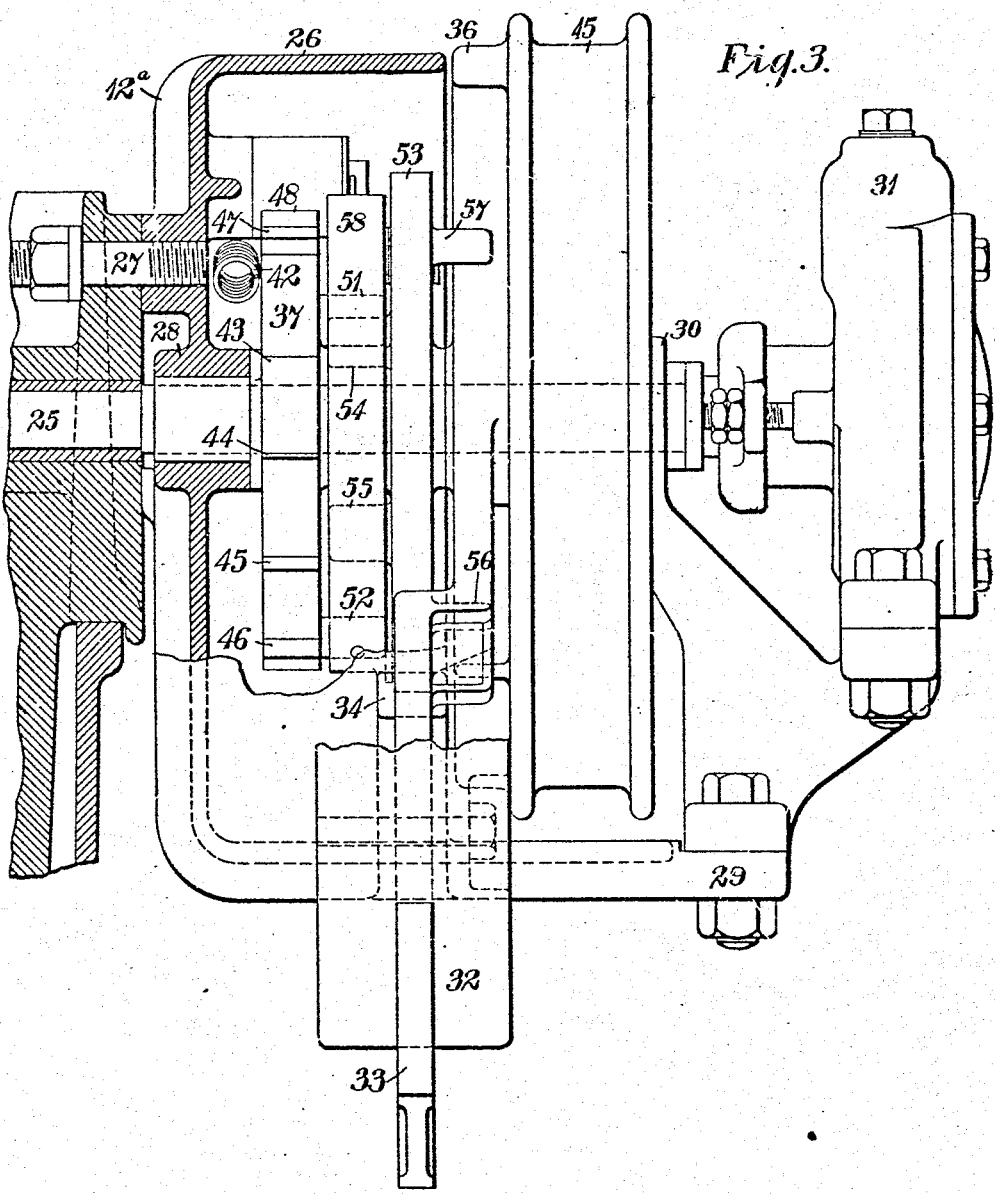

Figure 1 is a view of a system of pump control which is arranged in accordance with my invention and Figs. 2 and 3 are, respectively, an end elevation with the sheave and bearing removed to disclose the operating parts, and a front elevation, partially in section, of the automatic control governing device illustrated in Fig. 1. Figs. 4, 5 and 6 are detail views of the spring-supports constituting parts of the controller-governing device. The governing device, as illustrated, is applied to a voltage-regulating controller for a pump-driving motor of the induction type but it is, of course, not confined to such use and may be readily adapted for governing controllers of various well known types such as are adapted for use with motors which are supplied with energy from either direct or alternating current sources.

Referring to the drawings, a fluid-containing storage tank 1, is supplied by a pump 2 through a feed pipe 3, and is provided with a float mechanism comprising a float 4 which is attached to a rod 5, one extremity of which is pivotally connected to a bracket 6, that projects inwardly from one side of the tank 1 near the normal fluid level. The float 4 is located near the free extremity of the rod 5 to be guided thereby in its movement as the fluid in the tank rises and falls. The pump 2 is driven by an electric motor 7 which is supplied with energy from a two-phase alternating current circuit 8, 9, 10 and 11, the voltage applied to the motor being regulated by a controller 12 (of a well known type, which comprises two similar autotransformers, a rotatably mounted, contact-carrying drum and a plurality of stationary engaging contact fingers.)

In order to start or stop the motor 7 automatically when the fluid in the tank 1 falls below or rises above predetermined limits, a governing device 12ᵃ is attached to the controller 12 and is actuated by the extremity 13 of the rod 5 by means of a rope or belt 14, that passes around a sheave 15 which is a part of the governing device and over a plurality of guide pulleys 16, 17, 18, 19 and 20. One portion of the belt 14, which is substantially vertical, is provided with a pair of stops 21 and 22 which are located at opposite sides of and are engaged by the rod 5 to impart motion to the belt and cause a rotation of the sheave 15 when the fluid in the tank rises sufficiently above or falls below its normal level. The extent of the belt motion is determined by stationary forked projections 23 and 24 which are located on the inside of the tank 1 in position to be respectively engaged by the stops 21 and 22. The belt 14 may advantageously be wrapped about the sheave 15 one or more full turns in order to avoid slipping while a weight on the governing device is being raised to the vertical position.

The shaft 25 of the governing device 12ª is integral with or is mechanically connected to the drum shaft of the controller 12 and the sheave 15 is rotatably mounted thereon. A stationary frame 26 is rigidly attached to the frame of the controller by clamping bolts 27 and embodies the inner bearing 28 of the device and a base 29 upon which an outer bearing 30 and a rotary dash pot 31 of any suitable construction are supported. A weight 32 is adjustably mounted upon an arm 33 which is rotatably mounted on the shaft 25, and the rotative movement of which is limited to an arc of substantially 250° by projections 34 and 35 upon the base 29. The arm 33 may be rotated from the position of engagement with either of the projections 34 and 35 into a vertical position by the sheave 15, which is provided with a flange 36, a segment of which, including approximately an arc of 125°, is cut away so that the arm 33 is permitted to fall independently of the sheave through the remaining 125° of its travel from the vertical position, by the action of gravity upon the weight 32.

A ratchet wheel 37 is keyed to the shaft 25, adjacent to the inner bearing 28 of the frame 26, and is engaged by a pair of pawls 38 and 39 which are pivotally mounted upon studs 40 and 41 that project from the frame. The pawls 38 and 39 are held in engagement with the ratchet wheel 37 by a helical spring 42, the centers of the studs 40 and 41 being located on a circumference concentric with the shaft 25 and of greater radius than that of the ratchet wheel. The periphery of the ratchet wheel is provided with a plurality of notches, 43, 44, 45, 46, 47, 48, 49 and 50 comprising two sets of four notches each, a surface of minimum radius being provided between the notches 43 and 47, surfaces of slightly greater radius being provided between the notches 43 and 44, and between the notches 47 and 48. Surfaces of still greater radius are provided between the notches 44 and 45, and between the notches 48 and 49, and surfaces of correspondingly increased radius are provided between the notches 45 and 46, and between the notches 49 and 50. The ratchet wheel is also provided with a pair of lateral projections 51 and 52 which are opposite the bearing 28. A cam 53 is rotatably mounted on the shaft next to the ratchet wheel 37 and is provided with a plurality of lateral projections 54 and 55 on one side, which correspond to the projections 51 and 52 on the ratchet and with other projections 56 and 57 on the opposite side. The projections 54 and 55 on the cam extend toward the ratchet wheel 37 and are a little nearer the center of the shaft than the corresponding projections 51 and 52 of the ratchet wheel so that they do not interfere with the relative movement of the ratchet wheel and cam. A spiral spring 58, which encircles the shaft 25 between the ratchet wheel 37 and the cam 53, is provided with hooked extremities 59 and 60 which normally engage the projections 51 and 54 and the projections 52 and 55, respectively, and is held in position by a pair of supports 61 and 62 which may be of punched sheet metal and which are rotatably mounted upon the shaft 25 between the hub of the ratchet wheel 37 and that of the cam 53. The pawls 38 and 39 are provided with bosses 63 and 64 which project laterally therefrom and which serve as bearings for pin shafts 65 and 66 upon which cylindrical rollers 67 and 68 are rotatably mounted to be engaged by the periphery of the cam 53. The projections 56 and 57, on the opposite side of the cam 53 from the projections 54 and 55, are engaged by the arm 33 to which the weight 32 is attached.

The relative action of the several parts may be more readily understood by assuming a specific case as follows: Assume that the fluid in the tank 1 is being drawn out so that the float 4 and the rod 5 are slowly moving downwardly through a small angle, the extremity of the rod 5 will engage the stop 21 that is attached to the belt 14 and the weight of the float will turn the sheave 15 until the stop 21 engages the forked projection 23. In this way, sufficient motion will be transmitted to the sheave 15 to move the weight arm 33, which is in engagement with projection 34 on the base 29 and also with the projection 56 of the cam 53 through an arc of substantially 125° into a vertical position, from which point it will engage the projection 57 of the cam 53, the two projections 56 and 57 being substantially 180° apart, and will fall through the remaining 125° of its travel into engagement with the projection 35 of the base 29. As the cam 53 is rotated by reason of the engagement of the arm 33 with its projection 57, the spiral spring 58 is put under tension, since the projection 55 on the cam carries the outer extremity of the spring through a corresponding angle, and the inner end of the spring is held stationary by the projection 54 on the ratchet wheel. In this way, the ratchet wheel 37 tends to rotate but is prevented by the pawl 38 which engages the notch 43 on its edge but after the cam has rotated through a predetermined angle, it trips the pawl since its periphery, which engages the roller 67 is so constructed that it forces the pawl out of engagement with the notch 43 in opposition to the action of the helical spring 42. As soon as the pawl is disengaged from the notch 43, the ratchet wheel is suddenly rotated through a short angle by the spiral spring 58 until the pawl engages the next notch 44 and since the ratchet wheel is keyed to a shaft which is connected with that of the contact-carrying drum of the controller this drum is also suddenly rotated through a corresponding angle, the distance between the notches on the ratchet being constructed to correspond to the angle of transition from one controller position to the next. As the cam rotates still farther, the pawl is disengaged from the next notch and another quick motion of the controller drum results. This arrangement provides a quick movement of the drum from each controller position to the next, which is essential to the best operating conditions of the controller and prohibits the drum from occupying other than predetermined positions. The time intervening between each transition from one controller position to the next may be determined by the position of the weight 32 along the arm 33 and by the dash pot 31 which retards the rotation of the arm. The rotary dash pot is preferably of such well known construction as will permit a free movement of the weight arm through the up stroke in either direction and through substantially all of the down stroke which brings the motor to rest. The arm 33 is also free to rotate through an arc of about 30° from the vertical, in the starting direction, so that the weight may accumulate a momentum sufficient to insure the complete operation of the controller.

The operation of this governing device, as explained, gradually starts the motor 7 which then continues running and pumping fluid into the tank until the float 4 rises and the extremity of the rod 5 engages the stop 22, when the belt 11 is returned through a corresponding linear distance and the sheave 15 is rotated through 125° in the opposite direction. The arm 33 then occupies substantially a vertical position and engages the projection 56 on the cam, which has been rotated from its former position near the projection 54 to its present vertical position, and as the weight again falls in the opposite direction, the cam is returned to its original position and the ratchet wheel 37, with the control drum, the motion of which is concurrent therewith, will be returned by the action of the spring, through a series of steps that are determined by the pawl 39 which successively engages the notches 50, 49, 48 and 47.

The shaft 25 of the governing mechanism may be connected to the shaft of the control drum by any convenient means, such as a crank shaft or a geared connection, and any suitable speed ratio may be used so that the mechanism may be mounted on the top of the controller or at a distance from it. It is usually more convenient to mount a pinion upon the control drum shaft which is engaged by a gear on the shaft of the mechanism in order to avoid the construction of an oil tight bearing for the latter, which would otherwise be necessary if the control drum is oil-immersed.

The size and arrangement of details of the governing device 12ª may, of course, be varied within the scope of my invention.

I claim as my invention:

1. The combination with a fluid pump, an electric driving motor therefor, a tank or reservoir supplied therefrom and a motor controller having a rotatable, contact-bearing drum, of a ratchet wheel, a driving spring, pawls and a cam for automatically actuating said drum by successive rapid steps to start or stop the motor as the fluid head in the reservoir falls below or rises above predetermined limits.

2. The combination with a fluid-pump, an electric driving motor therefor, a tank or reservoir supplied therefrom and a motor controller having a rotatable, contact-bearing drum, of means for automatically actuating said controller drum to start or stop the motor, as the fluid head in the reservoir falls below or rises above predetermined limits, said means comprising a driving sheave mechanically connected to said controller drum, a float located in said tank and operatively connected to said driving sheave, and spring, pawl and cam mechanism for imparting step by step movement to the controller drum.

3. The combination with a fluid-pump, an electric driving motor therefor, a tank or reservoir supplied therefrom and a motor controller having a rotatable, contact-bearing drum, of means for automatically actuating said controller drum to start or stop the motor, as the fluid head in the reservoir falls below or rises above predetermined limits, said means comprising a driving sheave or pulley, a weight-bearing arm interlocked therewith, a shaft connected to the controller drum shaft, a cam rotatably mounted on said shaft and provided with projections to engage the weight-bearing arm, a ratchet wheel fixed to said shaft, stationary pawls adapted to engage said ratchet wheel, and a spring which interconnects the cam and the ratchet wheel.

4. The combination with a fluid-pump, an electric driving motor therefor, a tank or reservoir supplied therefrom and a motor controller having a rotatable, contact-bearing drum, of means for automatically actuating said controller drum to start or stop the motor, as the fluid head in the reservoir falls below or rises above predetermined limits, said means comprising a driving sheave, a weight-bearing arm interlocked therewith, a shaft connected to the controller drum shaft, a cam rotatably mounted on said shaft and provided with lateral projections to engage the weight-bearing arm, a ratchet wheel fixed to said shaft, stationary pawls adapted to engage said ratchet wheel, a spring which connects the cam and the ratchet wheel together, and means for turning said sheave through a predetermined angle in the one or the other direction as the fluid in the reservoir rises above or falls below predetermined limits.

5. A governing device for an electric motor controller of the drum type, comprising a shaft connected to the drum shaft of the controller and a cam having lateral projections, a driving sheave and a weight-bearing arm, all rotatably mounted upon said shaft, a ratchet wheel fixed to said shaft, stationary pawls adapted to engage said ratchet wheel, and a spiral spring which connects the cam and the ratchet wheel together.

6. In a governing device for an electric motor controller having a rotatable contact-carrying drum, the combination with a shaft connected to the drum shaft, a cam having lateral projections, a driving sheave or pulley and a weight-bearing arm interlocked therewith, all rotatably mounted on said shaft, and a ratchet wheel fixed to said shaft, of stationary pawls adapted to engage said ratchet wheel and be tripped by said cam, and a spiral spring which interconnects the cam and the ratchet wheel.

7. The combination with a fluid-pump, a tank or reservoir supplied therefrom, an electric driving motor for said pump, a controller for said motor having a rotatably mounted, contact-carrying drum, and means for automatically governing said controller, said means comprising a driving sheave rotatably mounted upon the shaft of said drum, a float located in said tank and operatively connected to said driving sheave, a weighted lever arm movable by said driving sheave through substantially one-half of its movement path and by gravity through the remainder of said path, ratchet and pawl mechanism for arresting the gravity movement of said lever arm, and a cam for effecting successive disengagement of the pawl and ratchet mechanism.

8. The combination with a fluid-pump, an electric driving motor therefor, a tank or reservoir supplied from said pump, a controller for said motor having a rotatable contact-carrying drum, of a spring and a weight for automatically turning the drum, a ratchet and pawls and a cam for limiting the movement to a series of steps to start or stop the motor, and means for governing said mechanism in accordance with the fluid level in said reservoir.

9. The combination with a device operated by fluid-level variations and a controller having a rotatable, contact-bearing drum, of a sheave connected to said device, a lever arm having a weight and actuated by said sheave through substantially one-half of its movement path in each direction and by gravity through the other half of said path, a spring energized by the action of the weight, a driving shaft mechanically connected to the controller drum shaft, and means for insuring a step-by-step operation of said drum shaft.

10. The combination with a device operated by fluid-level variations, and an electric-motor controller having a rotatable contact-bearing drum, of a sheave mechanically connected to said fluid-operated device, a weighted lever arm pivotally mounted to be moved to a given degree by said sheave and by gravity to a further degree, a spring energized by said lever arm during its movement by gravity, pawl and ratchet mechanism for arresting the gravity movement of said lever arm, and a cam for effecting successive disengagements of said pawl and ratchet mechanism.

In testimony whereof, I have hereunto subscribed my name this 16th day of December, 1905.

WILLIAM A. PARIS.

Witnesses:
EDWIN LEHR,
BIRNEY HINES.